(12) United States Patent
Payne

(10) Patent No.: US 6,857,620 B2
(45) Date of Patent: Feb. 22, 2005

(54) METHOD AND APPARATUS FOR TRUCK TARP LOADING

(76) Inventor: Fred V. Payne, 516 W. Main St., Fredonia, NY (US) 14063

( * ) Notice: Subject to any disclaimer, the term of this patent is extended or adjusted under 35 U.S.C. 154(b) by 179 days.

(21) Appl. No.: 10/241,883

(22) Filed: Sep. 11, 2002

(65) Prior Publication Data

US 2004/0046161 A1 Mar. 11, 2004

(51) Int. Cl.⁷ .............................................. B66D 1/36
(52) U.S. Cl. ........................ 254/324; 135/88.1; 135/90; 135/119; 52/3
(58) Field of Search ............................... 254/323, 324, 254/325; 414/460, 461; 135/87, 88.1, 88.01, 90, 157, 119, 120.3; 52/3, 126.1, 123.1

(56) References Cited

U.S. PATENT DOCUMENTS

| | | | | |
|---|---|---|---|---|
| 209,519 A | * | 10/1878 | Sands ........................... 5/86.1 |
| 2,529,948 A | | 11/1950 | Jones ............................ 61/67 |
| 3,397,009 A | | 8/1968 | Landenberger ............. 296/100 |
| 3,614,154 A | | 10/1971 | Evans ........................ 296/137 |
| 3,941,363 A | | 3/1976 | Ogg ............................ 269/100 |
| 4,236,859 A | * | 12/1980 | Stearn et al. ............... 414/460 |
| 4,302,043 A | | 11/1981 | Dimmer et al. ............... 296/98 |
| 4,572,568 A | | 2/1986 | Kapp et al. ................... 296/39 |
| 4,861,218 A | * | 8/1989 | Lamer ........................ 414/461 |
| 5,074,528 A | * | 12/1991 | Long, Jr. .................... 254/285 |
| 5,111,554 A | | 5/1992 | Sweers .......................... 24/16 |
| 5,564,232 A | | 10/1996 | Callaway .......................... 5/4 |
| 5,692,534 A | | 12/1997 | Brumfield .................... 135/90 |
| 5,743,515 A | | 4/1998 | Wodell ....................... 254/334 |
| 5,743,700 A | | 4/1998 | Wood, Jr. et al. ........... 414/498 |
| 5,769,105 A | * | 6/1998 | Margol et al. ................ 135/90 |
| 5,772,183 A | * | 6/1998 | Sears .......................... 254/324 |
| 5,964,236 A | | 10/1999 | Berke .......................... 135/87 |
| 6,003,939 A | | 12/1999 | Nakai et al. ................ 296/100 |
| 6,102,059 A | * | 8/2000 | Miller ......................... 135/87 |
| 6,203,472 B1 | | 3/2001 | McCaffrey et al. ........... 482/61 |
| 6,273,401 B1 | | 8/2001 | Payne ........................ 254/266 |
| 6,464,208 B1 | * | 10/2002 | Smith ......................... 254/324 |
| 2001/0037709 A1 | | 11/2001 | Kuchta et al. ................. 83/23 |
| 2001/0037710 A1 | | 11/2001 | Kuchta et al. ................. 83/84 |

FOREIGN PATENT DOCUMENTS

| | | | | |
|---|---|---|---|---|
| DE | 35 46 070 A | 1/1987 | ............ B60P/7/02 |
| JP | 08 150872 A | 6/1996 | ............ B60P/7/04 |

* cited by examiner

*Primary Examiner*—Emmanuel Marcelo
(74) *Attorney, Agent, or Firm*—The Bilicki Law Firm P.C.

(57) ABSTRACT

The present invention is an apparatus and method for covering truck beds, rail cars, or other large objects with a tarp or related covering in which the tarp is held to the truck tarp loader by a fastening roller member comprised of: a vertical support member with first and second ends; a first horizontal member fixedly secured to the first end, forming an L shape; a second horizontal member fixedly secured to the second end, also forming an L shape; an axle, a pair of wheels, and a handle pivotally attached to the first horizontal member; a pair of tensioners between the vertical support member and the axle; and a fastening mechanism on the second horizontal member for attaching the fastening roller member to the truck tarp loader apparatus. The tensioners, axle, pair of wheels, and handle form a cover grasping mechanism that holds the tarp or covering secure enough to support the weight of the tarp or covering, but allows an operator to slide the tarp or covering out from under the fastening roller member without having to disengage the cover grasping mechanism.

43 Claims, 9 Drawing Sheets

METHOD AND APPARATUS FOR TRUCK TARP LOADING

FIELD OF INVENTION

The present invention generally relates to an apparatus and method for covering large containers and more particulary to the process of covering loaded trucks and rail cars with tarps or related coverings.

DETAILED DESCRIPTION OF EMBODIMENTS OF THE INVENTION

Figure 1:
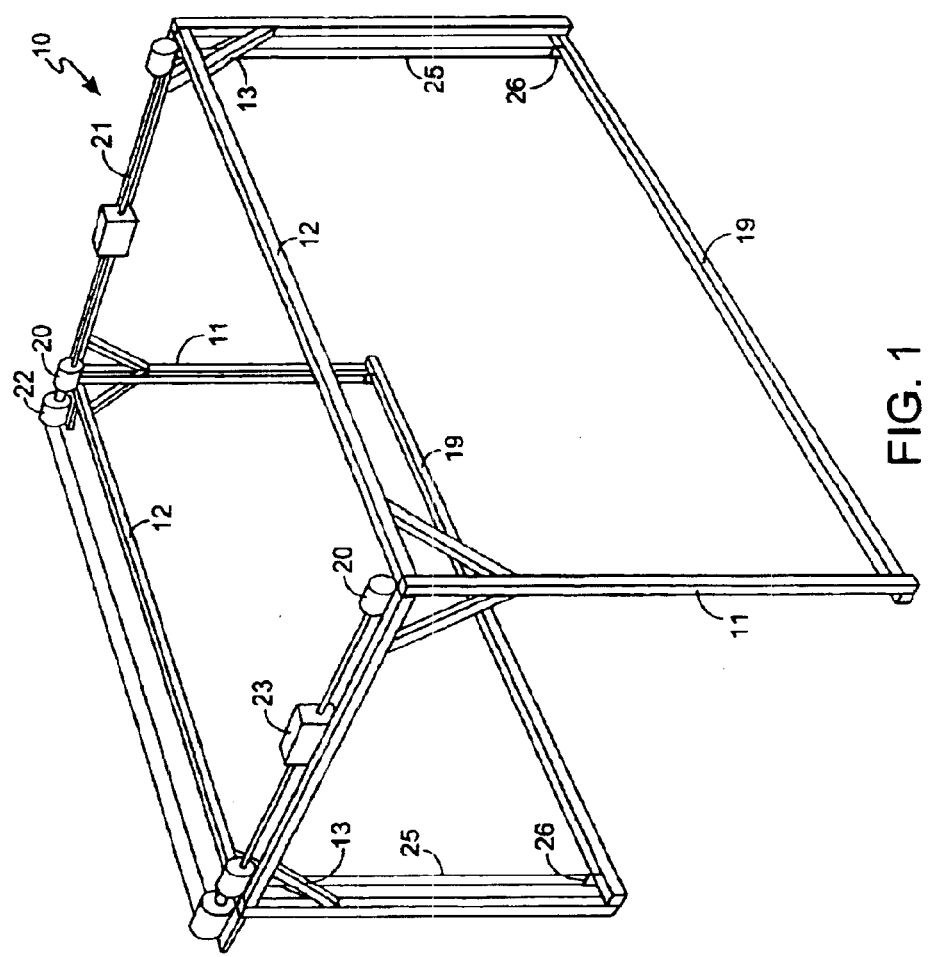
FIG. 1 depicts a top perspective view of one fundamental unit of the truck covering apparatus without fastening roller members being present on the arms.

Referring now to the drawings in detail, for the ease of the reader, like reference numerals designate identical or corresponding parts throughout the views depicted in the drawings.

FIG. 1 shows a top perspective view of one embodiment of a fundamental unit of truck covering apparatus 10. The unit can also be used to cover other large objects such as rail cars. In the embodiment shown, four vertical support members 11 are attached to rectangular top frame 12 to form the framework for truck covering apparatus 10. Other numbers of vertical support members 11 or other shapes of top frame 12 can be used, adapted to the shape of the cover and the object to be covered. One of ordinary skill in the art will appreciate that other types of support could be used to support top frame 12. For example, in one alternate embodiment, the support is a suspension, and frame 12 is suspended from one or more roof supports without the use of vertical supports. In another alternate embodiment, the support is an overhead crane which lifts truck covering apparatus 10 and suspends it above the object to be covered.

In the embodiment shown in FIG. 1, the framework has th addition of support beams 13 at each corner to provide greater strength and stability. Secured to two corners of top frame 12, on opposite ends of a long side of the rectangular top frame 12, are two gear motors 22. Each gear motor 22 rotates keyed shaft 21 that is fixedly secured on both ends to spool 20. Gear motors 22, shaft 21, and spools 20 comprise one embodiment of a lifting device. Coupling device 23 is located in the middle of the short side of rectangular top frame 12 and stabilizes keyed shaft 21. One of ordinary skill in the art will readily appreciate that gear motors 22 can be placed almost anywhere on or near top frame 12 such that they remain in functional contact with keyed shaft 21. Furthermore, one of ordinary skill in the art will recognize that the lifting device could also be one or more chain falls, an overhead crane, a rope and pulley system, or one or more winches.

Also in the embodiment shown in FIG. 1, fixedly secured to spools 20 are lifting connectors 25 that extend downward from spools 20 and are attached to arms 19 through the use of lifting U-hooks 26. Each spool 20 is attached to lifting connector 25 by a lifting connector attachment member (not shown). In one embodiment, lifting connectors 25 are straps, but can, alternatively, be chains, ropes, cable, link belt, or any other flexible material capable of lifting the weight involved. Arm 19 are lifted when spools 20 are rotated and lifting connectors 25 wrap around spools 20, keeping arms 19 is substantially parallel to top frame 12. Each of spools 20 operates at the same speed so as to allow smooth and simultaneous lifting of arms 19. In this embodiment, there are four spools 20 mounted to the four corners of top frame 12, but one of ordinary skill in the art will recognize that other numbers and locations may be used, and may be required for alternative shaped frames. Alternative lifting mechanisms include, but are not limited to, chain falls, an overhead crane, ropes and pulleys, and winches. The means by which the tarp or other covering is secured to arms 19 discussed infra.

Figure 2:
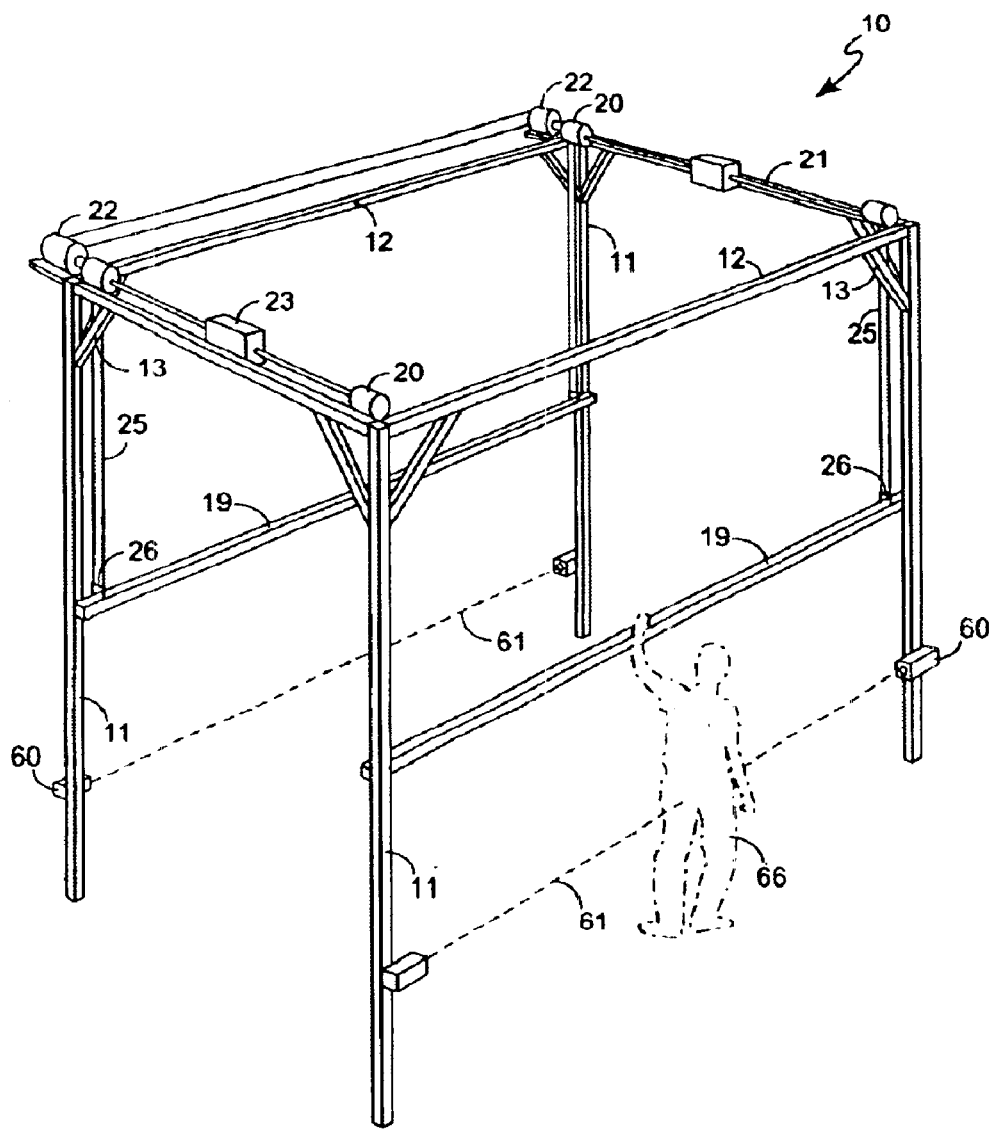
FIG. 2 shown an alternate embodiment of the truck covering apparatus including a safety mechanism.

FIG. 2 shows an alternate embodiment of truck covering apparatus 10 in which a safety mechanism, i.e. laser detection system 60, has been is added to truck covering apparatus 10 to prevent damage or injury that can be caused by person 66 or object entering the intended travel path of arms 19. If laser path 61 is interrupted by an object or person 60, power to truck covering apparatus 10 is severed, halting the ascent or descent of arms 19. Once the object or person 60 has been removed, the device is reset and the tarp loading procedure is continued. In another embodiment, proximity switches are added at the top and/or bottom of vertical support members 11 to control the upper and lower allowable height traveled by arms 19.

Figure 3:
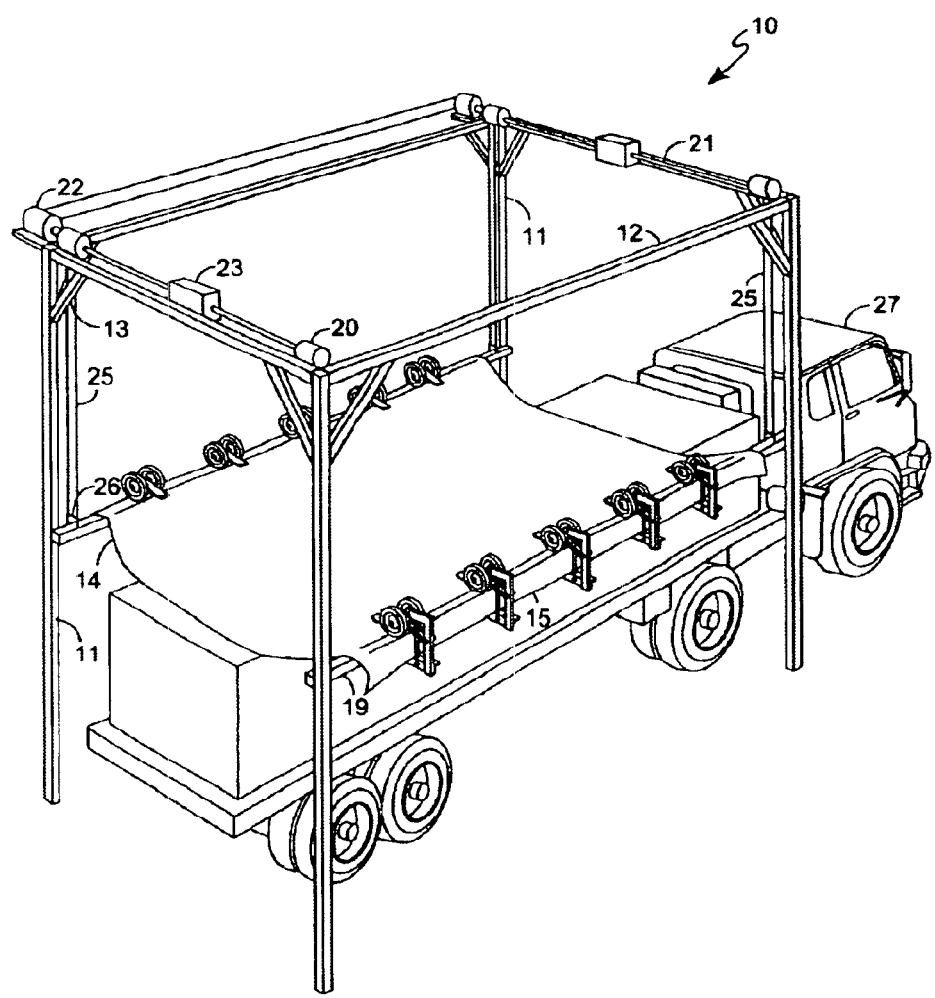
FIG. 3 depicts a top perspective view of one fundamental unit with the covering secured by fastening roller members and raised above the height of the loaded truck.

FIG. 3 shows a top perspective view of an embodiment of truck covering apparatus 10, with covering 14 secured to arms 19 by fastening roller members 15 and raised above the height of loaded truck 27 to be covered. As described in FIG. 1, the rotation of spools 20 wraps lifting connectors 25 around spools 20 and allows for the smooth and simultaneous lifting of arms 19 above loaded truck 27. Covering 14 is secured in place by a plurality of fastening roller members 15. The number of fastening roller members 15 varies according to the size and material of covering 14. Covering 14 can be plastic, cloth, canvas, or any other fabric commonly known in the art for covering truck loads. If covering 14 is long and/or made of a heavy material, a greater number of fastening roller members 15 may be required than if covering 14 is short or made of a light material.

As shown in FIG. 1, FIG. 3 shows truck covering apparatus 10 in operation without the use of web straps, quick release hangers (described in detail infra), and U-hooks. However, in an alternate embodiment, truck covering apparatus 10 employs both fastening roller members 15 and a combination of quick release hangers, U-hooks, and web straps to secure covering 14 to arms 19. Web straps are typically made of nylon, but can be made of any flexible and strong material commonly known in the art.

Figure 4:
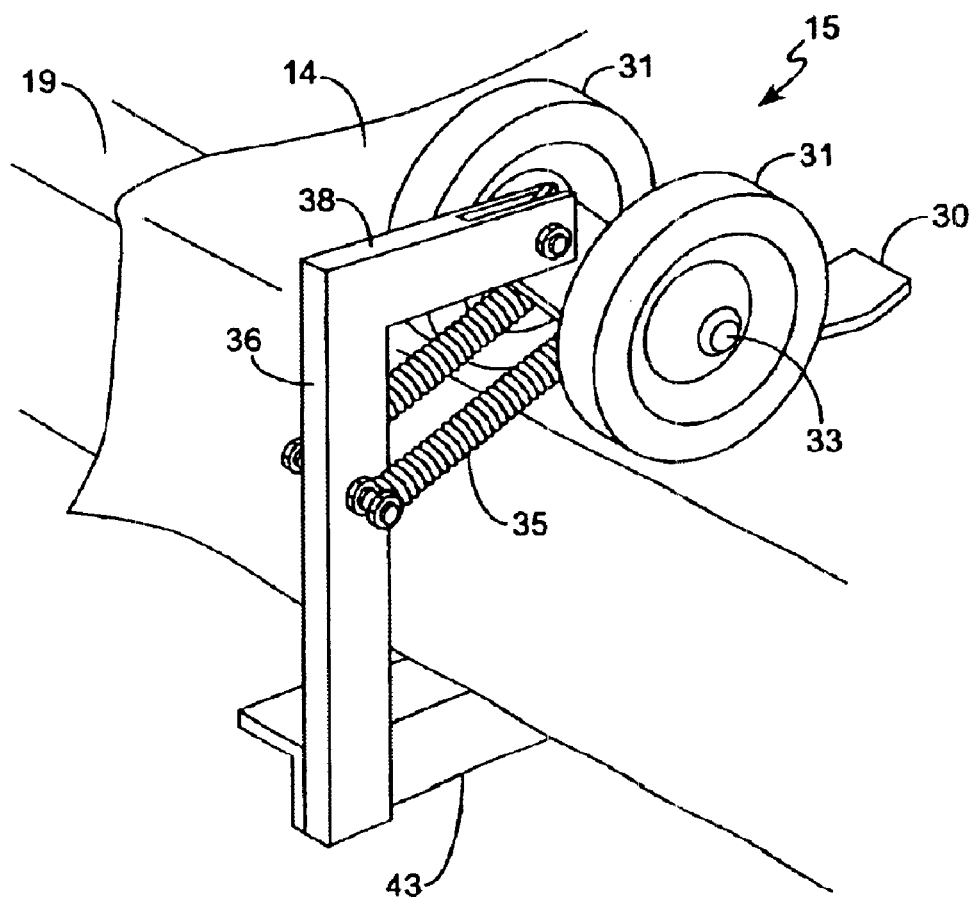
FIG. 4 shows a top perspective view of one of the fastening roller members securing a covering.

FIG. 4 shows a top perspective view of one fastening roller member 15 securing covering 14 to arm 19. In one embodiment, fastening roller member 15 is made of steel tubing. Alternately, it can be made of any other strong metal such as aluminum. Fastening roller member 15 is generally comprised of: vertical support member 36, having a first and second end, first horizontal member 38 fixedly secured to the first end of vertical support member 36, forming a first L-shape, second horizontal member 43 fixedly secured to the second end of vertical support member 36, forming a second L-shape and having a fastening mechanism (not shown, concealed by covering 14) for attaching fastening roller member 15 to truck covering apparatus 10, handle 30 with a rectilin ar wall pivotally attached to first horizontal member 38, an axle (not shown, concealed by wheels 31) going through the rectilinear wall, a pair of wheels 31 attached to the axle and ending with cap 33 to secure wheels 31 to the axle, and a pair of tensioners 35 connecting the axle to first horizontal member 38. Tensioners 35 are attached to vertical support member 36 by a screw, bolt, rivets, fastening posts, pins, or any other means on one end and attached to the axle on the other end. In the embodiment shown in FIG. 5, tensioners 35 are a pair of springs. Alternately, tensioners 35 can be electric solenoids, hydraulic cylinders, air cylinders, or any other device commonly known in the art, allowing a more positive control and a lighter grasp of covering 14.

Tensioners 35, wheels 31, axle (not visible), and handle 30 form one embodiment of a cover grasping mechanism. As shown in FIG. 5, because of tensioners 35, wheels 31 exert a downward force on covering 14, pinching it between wheels 31 and arm 19 and securing covering 14 in place. Handle 30 is shown in the closed position, which is in a lower position than first horizontal member 38, and is substantially in parallel with first horizontal member 38 and second horizontal member 43.

Figure 5A:
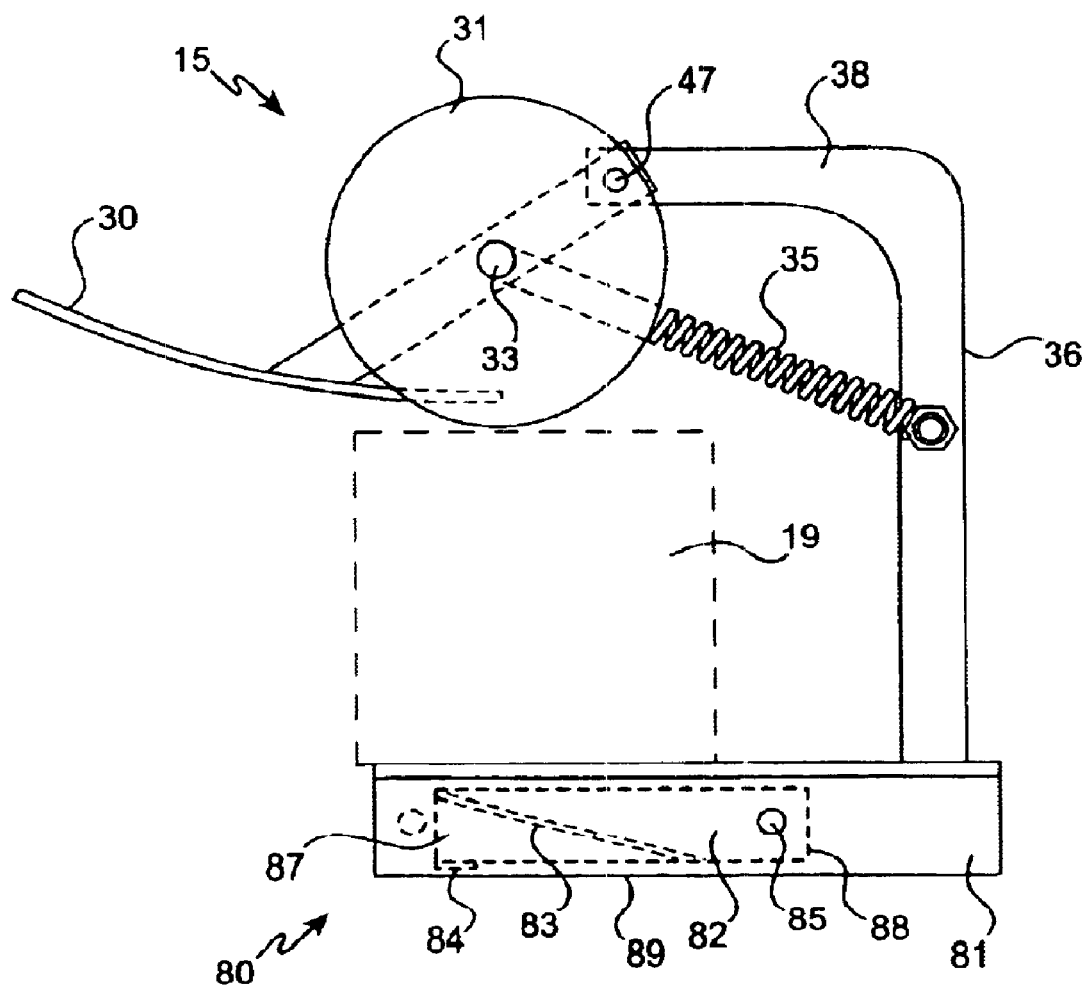
FIGS. 5A and 5B show cross-sectional and top perspective views, respectively, of one embodiment of a quick release hanger.
Figure 5B:
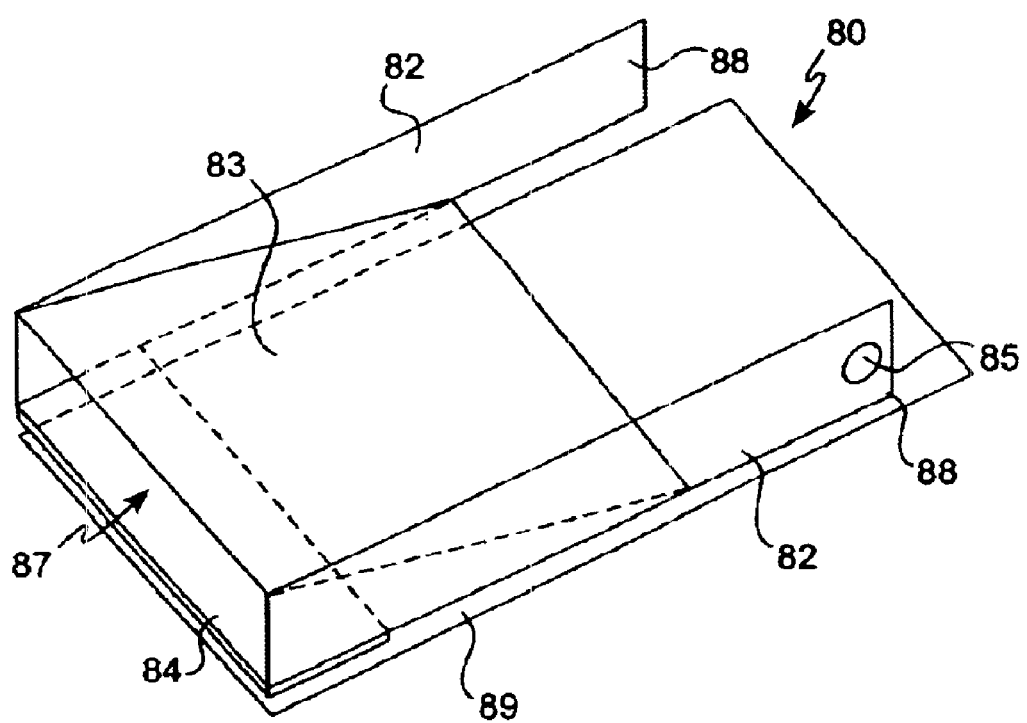

FIG. 5A shows a cross-sectional view of one embodiment of fastening roller member 15 used in conjunction with one embodiment of quick release hanger 80, affixed to arm 19. FIG. 5B shows a top perspective of just quick release hanger 80. FIGS. 5A and 5B will be used simultaneously to describe quick release hanger 80.

Quick release hanger 80 is particulary useful when the tarp to be placed on a vehicle is shorter than the width of the truck tarp loading apparatus, making the use of quick release hanger 80 and support straps (not shown) necessary, or can be used in addition to fastening roller member 15 for additional support of the tarp to be loaded. Quick release hanger 80 is comprised of base member 89, side members 81 (shown only in FIG. 5A), angled plate 83, cross plate 84, and two side plates 82. Angled plate 83 and cross plate 84 form opening 87 therebetween. Side plates 82, which pivot about pivot 85, functionally engage side members 81, which functionally engages arm 19, one side plate 82 being on one side of vertical support member 36 and the second side plate 82 being on the other side such that quick release hanger 80 straddles fastening roller member 15.

The first end of the strap (not shown) is secured to the first arm (not shown), and the second end of the strap is loaded through opening 87, under angled plate 83 and above cross plate 84. The strap must pass beyond the lowermost point of angled plate 83. Angled plate 83 helps guide the strap into the proper location, but also holds the strap in place when the strap is engaged. As the weight of the strap pushes down on cross plate 84, quick release hanger 80 pivots around pivot 85. As side plates 82 and angled plate 83 rotate, the lowermost point of angled plate 83 moves downward, pinching the strap between angled plates 83 and base member 89. The greater the weight of the strap, with or without the tarp loaded thereon, the greater the downward force of cross plate 84 and the greater the pinching force of angled plate 83 on the tarp. Also, when arms 19 of the tarp loading apparatus are low red, and as th straps and tarp engage the cargo on the vehicle to be covered, the straps exert an upward force on angled plat 83. Side plates 82 and angled plat 83 pivot upward, automatically releasing the straps.

Figure 6:
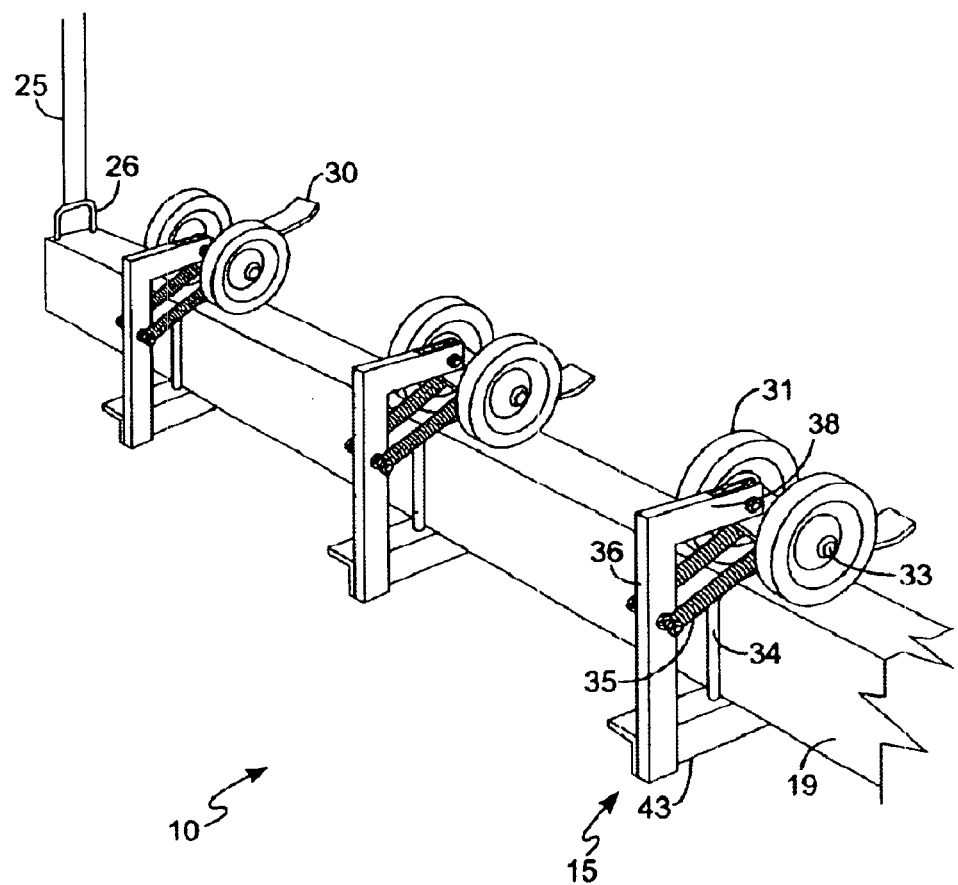
FIG. 6 depicts a top perspective view of a plurality of fastening roller members mounted to one of the arms of the truck covering apparatus, with the cover grasping mechanism in the closed or partially closed position.

FIG. 6 shows a top perspective view of a plurality of one embodiment of fastening roller members 15 mounted to arm 19 of truck covering apparatus 10. FIG. 6 also shows one lifting connector 25 attached to U-hook 26 which permits arm 19 to be raised and lowered. In this view, most of the same features shown and described in FIG. 5 can also be seen. It can be better appreciated in FIG. 6 that when handle 30 is in the dosed position, it is substantially parallel to first horizontal member 38 and second horizontal member 43. It can also be dearly seen that cover grasping mechanism (tensioners 35, wheels 31, axle (not shown), and handle 30) is positioned below first horizontal member 38.

The lack of a covering in FIG. 6 allows for a view of fastening mechanism 34. Fastening mechanism 34 wraps around a portion of arm 19 and is secured to second horizontal member 43 (second point of attachment to arm 19 concealed by arm 19). Fastening mechanism 34 can fixedly secure fastening roller member 15 to arm 19 or be such that, when loosened, the device can be slid along arm 19 to adjust for different sizes, shapes, and weights of the tarp or covering. Fastening mechanism 34 also allows for fastening roller members 15 to be added to or removed from truck covering apparatus 10. Fastening mechanism 34 is made of any sound and strong structural material. In one embodiment, fastening mechanism 34 is a U-bolt with the two ends secured to second horizontal member 43 and wrapping around arm 19, but it can be appreciated that other means of attachment known in the art can be used.

Figure 7:
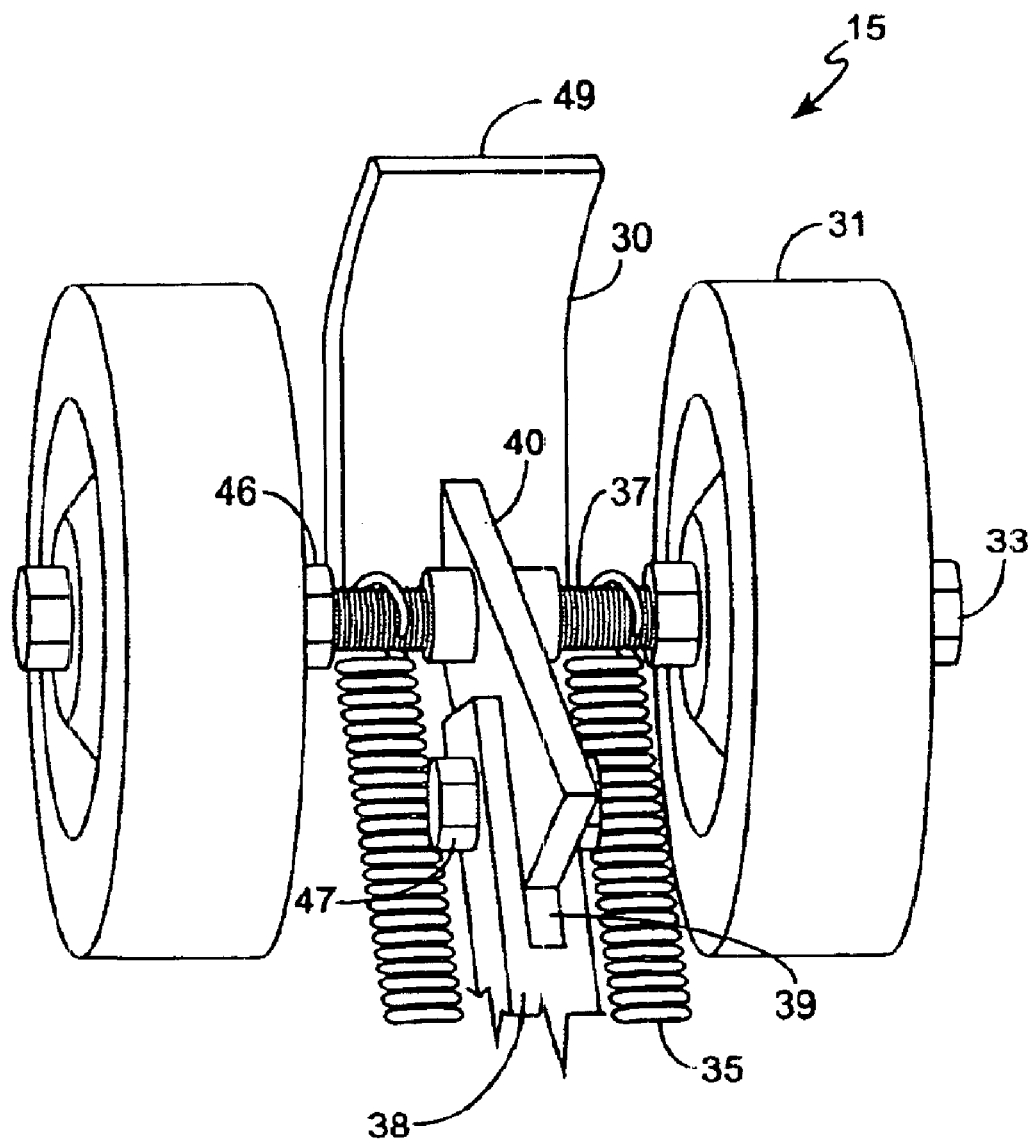
FIG. 7 depicts a perspective top view of the cover grasping mechanism.

FIG. 7 shows a perspective top view of one embodiment of fastening roller member 15, including first horizontal member 38, handle 30, and tensioners 35. First horizontal member 38 has slot 39 at the end away from the vertical support member (not shown). Handle 30 has small rectilinear wall 40 extending perpendicularly from handle 30. In this embodiment, handle 30 is elongated with a slight curve at tip 49. In another embodiment, handle 30 and rectilinear wall 40 are one contiguous piece. Axle 37 passes through rectilinear wall 40 with wheels 31 and cap 33 attached to it. Tensioners 35 are attached to axle 37 on one end and to the vertical support member on the other end. FIG. 7 shows fastening roller member 15 in the closed position. Tensioners 35 pull axle 37 and wheels 31 downward towards the arm (not shown), holding the covering (not shown) between wheels 31 and the arm. The pressure exerted by wheels 31 against arm is sufficient to hold the cover in place, but still allows removal of the cover with a pull or tug by an operator.

When moved to the open position, handle 30, axle 37, wheels 31, and rectilinear wall 40 pivot around pivot bolt 47. Tensioners 35 stretch to allow rotation around pivot bolt 47 and then pull axle 37 and wheels 31 toward vertical support member, holding wheels 31 in a lifted position to leave space to manipulate the covering between wheels 31 and the arm.

Figure 8:
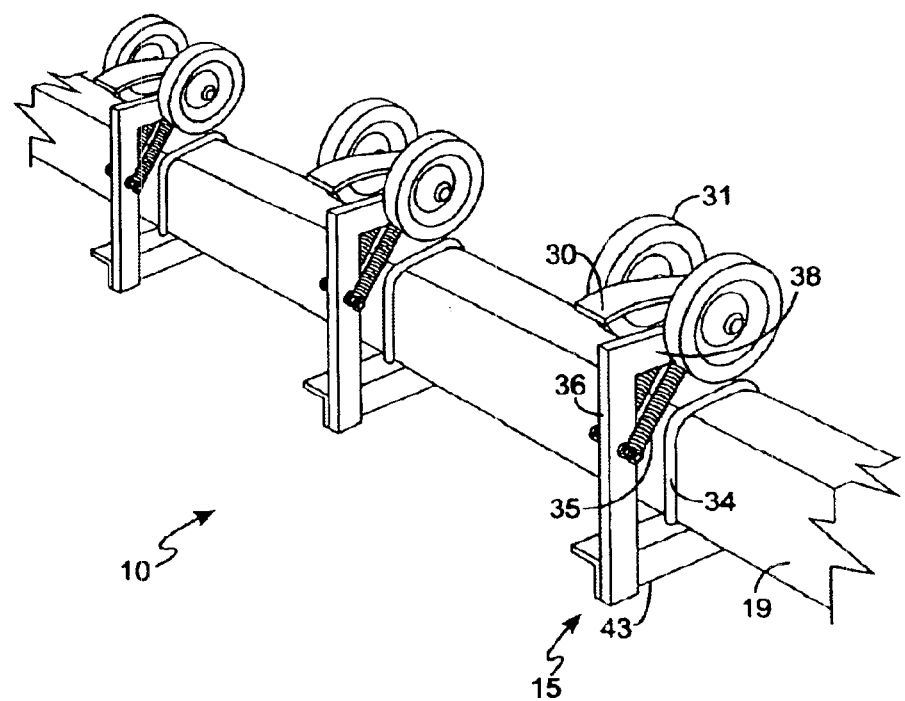
FIG. 8 depicts a top perspective view of a plurality of fastening roller members mounted to one arm of the truck covering apparatus with the cover grasping mechanism in the open position.

FIG. 8 shows a top perspective view of a plurality of fastening roller members 15 mounted to arm 19 of truck covering apparatus 10 with handle 30 in the open position. When in the open position, wheels 31 are lifted and retracted. It can be appreciated that cover grasping mechanism (tensioners 35, wheels 31, axle (not visible), and handle 30) is above first horizontal member 38. The amount of space left to manipulate the covering between arm 19 and wheels 31 can also be appreciated, as can fastening mechanism 34. It can further be appreciated that when fastening roller member 15 is in the open position, handle 30 is extending in an opposite direction from the axle, though still generally parallel to first horizontal member 38 and second horizontal member 43.

Although the invention is described by reference to a specific preferred embodiment, it is obvious to one skilled in the art that variations can be made without departing from the spirit and scope of the invention as claimed.

What is claimed is:

1. An apparatus for covering a large object comprising:
    a top frame;
    a support for said top frame;
    a lifting device attached to said top frame, said lifting device operatively engaging a plurality of arms, said plurality of arms substantially parallel to said top frame;
    a plurality of hanging members attached to said plurality of arms;
    a plurality of lifting connectors, each of said plurality of lifting connectors attached on a first end to said plurality of hanging members and operatively attached on a second end to said lifting device; and
    one or more fastening roller members mounted to said plurality of arms.

2. The apparatus for covering a large object of claim 1, wherein said support for said top frame is selected from a group comprising: roof supports, an overhead crane, and a plurality of vertical supports.

3. The apparatus for covering a large object of claim 1, wherein said lifting device comprises:
    a shaft;
    one or motors mounted to said top frame, operatively engaging said shaft; and
    a plurality of spools mounted to said shaft, said plurality of spools each having a lifting connector attachment member operatively engaging one of said plurality of lifting connectors.

4. The apparatus for covering a large object of claim 1, wherein said lifting device is selected from a group comprising on or more chain falls, an overhead crane, a rope and pulley system, and one or more winches.

5. The apparatus for covering a large object of claim 1, wherein said plurality of lifting connectors is selected from a group comprising straps, ropes, chains, cables, and link belts.

6. The apparatus for covering a large object of claim 1, wherein said one or more fastening roller members are comprised of:
    a vertical support member, having a first end and a second end;
    a first horizontal member fixedly secured to said first end of said vertical support member, forming an L shape with said vertical support member and having portions forming a slot;
    a second horizontal member fixedly secured to said second end of said vertical support member, forming an L shape with said vertical support member;
    a fastening mechanism for attaching said one or more fastening roller members to said plurality of arms; and
    a cover grasping mechanism.

7. The apparatus for covering a large object according to claim 6, wherein said fastening mechanism is a U-bolt with a first end and a second end, said U-bolt engaging an arm of said plurality of arms and said first end and said second end of said U-bolt secured to said second horizontal member.

8. The apparatus for covering a large object according to claim 6, wherein said cover grasping mechanism is comprised of:
    a handle with a tip, said handle having a rectilinear wall extending perpendicularly from said handle and pivotally engaged to said first horizontal member by a pivot bolt inside said slot, lowering a pair of wheels whenever said handle is in a dosed position, and raising said pair of wheels whenever said handle is in an open position, said pair of wheels rolls to allow a cover upon said large object to be released and is operatively attached to an axle, said axle penetrating said rectilinear wall; and
    a pair of tensioners, each having a first end and a second end, said pair of tensioners secured to said vertical support member at said first ends and to said axle at said second ends.

9. The apparatus for covering a large object of claim 8, wherein said pair of tensioners is selected from a group comprising springs, air cylinders, hydraulic cylinders, and electric solenoids.

10. The apparatus for covering a large object of claim 8, wherein said tip is curved.

11. The apparatus for covering a large object of claim 8, wherein said cover is made of a material selected from a group comprising plastic and canvas.

12. The apparatus for covering a large object of claim 1, wherein said large object is selected from a group comprising a loaded bed of a truck and a rail car.

13. The apparatus for covering a large object according to claim 1, wherein said apparatus is further comprised of a safety device, said safety device being a laser detection system for detecting one or more obstructions and halting said apparatus.

14. An apparatus for covering a large object comprising:
    a top frame with a length and a width;
    a plurality of vertical support members attached to said top frame;
    a plurality of arms parallel to said top frame, said plurality of arms substantially extending the length of said top frame between a first vertical support member and a second vertical support member of said plurality of vertical support members;
    a lifting device operatively engaging said plurality of arms to move said plurality of arms in a vertical fashion while keeping said plurality of arms substantially horizontal;
    a plurality of hanging members attached to said plurality of arms;
    a plurality of lifting connectors, each of said plurality of lifting connectors attached on a first end to one of said plurality of hanging members and operatively attached on a second end to said lifting device; and
    one or more fastening roller members mounted to said plurality of arms.

15. The apparatus for covering a large object according to claim 14, wherein said lifting device comprises:
    a shaft;
    one or motors mounted to said top frame, operatively engaging said shaft; and a plurality of spools mounted to said shaft, said plurality of spools each having a lifting connector attachment member operatively engaging one of said plurality of lifting connectors.

16. The apparatus for covering a large object according to claim 14, wherein said lifting device is selected from a group comprising one or more chain falls, an overhead crane, a rope and pulley system, and one or more winches.

17. The apparatus for covering a large object according to claim 14, wherein said plurality of lifting connectors is selected from a group comprising straps, ropes, chains, cables, and link belts.

18. The apparatus for covering a large object according to claim 14, wherein said one or more fastening roller members are comprised of:
   a vertical support member, having a first end and a second end;
   a first horizontal member fixedly secured to said first end of said vertical support member, forming an L shape with said vertical support member and having portions forming a slot;
   a second horizontal member fixedly secured to said second end of said vertical support member, forming an L shape with said vertical support member;
   a fastening mechanism for attaching said one or more fastening roller members to said plurality of arms, said fastening mechanism being a U-bolt with a first end and a second end, said U-bolt engaging an arm of said plurality of arms and said first end and said second end of said U-bolt secured to said second horizontal member; and
   a cover grasping mechanism.

19. The apparatus for covering a large object according to claim 18, wherein said cover grasping mechanism is comprised of:
   a handle with a curved tip, said handle having a rectilinear wall extending perpendicularly from said handle and pivotally engaged by a pivot bolt to said first horizontal member inside said slot, forming a first substantially horizontal line whenever said handle is in a dosed position, lowering a pair of wheels, and forming a second substantially horizontal line whenever said handle is in an open position, raising said pair of wheels, said pair of wheels operatively attached to an axle, said axle passing through said rectilinear wall, wherein said pair of wheels rolls to allow a cover upon said large object to be released; and
   a pair of tensioners each having a first end and a second end, said pair of tensioners secured to said vertical support member at said first end and to said axle at said second end.

20. The apparatus for covering a large object according to claim 19, wherein said pair of tensioners is selected from a group comprising springs, air cylinders, hydraulic cylinders, and electric solenoids.

21. The apparatus for covering a large object according to claim 19, wherein said cover is made of a material selected from a group comprising canvas and plastic.

22. The apparatus for covering a large object according to claim 14, wherein said large object is selected from a group comprising a loaded bed of a truck and a rail car.

23. The apparatus for covering a large object according to claim 14, wherein said apparatus comprises a safety device, said safety device being a laser detection system for detecting one or more obstructions and halting said apparatus.

24. An apparatus for covering a large object comprising:
   a fundamental unit comprising a plurality of vertical support members attached to a top frame;
   a first arm and a second arm, said first arm and said second arm substantially extending between said plurality of vertical support members;
   a lifting device operatively engaging said first arm and said second arm to simultaneously move said first arm and said second arm in a vertical fashion while keeping said first arm and said second arm substantially horizontal;
   one or more fastening roller members mounted to said first arm and said second arm; and
   a plurality of straps secured to said first arm at a plurality of fixed attachment members and attached to said second arm at a plurality of quick-release attachment members.

25. The apparatus for covering a large object according to claim 24, wherein said lifting device comprises:
   a shaft;
   one or motors mounted to said top frame, operatively engaging said shaft;
   a plurality of spools mounted to said shaft, said plurality of spools each having a lifting connector attachment member for operatively engaging a plurality of lifting connectors, wherein each of said plurality of lifting connectors is attached on a first end to one of said lifting connector attachment members of said plurality of spools and connected on a second end to said first arm or said second arm.

26. The apparatus for covering a large object according to claim 24, wherein said lifting device is selected from a group comprising one or more chain falls, an overhead crane, a rope and pulley system, and one or more winches.

27. The apparatus for covering a large object according to claim 24, wherein said one or more fastening roller members are comprised of:
   a vertical support member, having a first end and a second end;
   a first horizontal member fixedly secured to said first end of said vertical support member, forming an L shape with said vertical support member and having a portion forming a slot;
   a second horizontal member fixedly secured to said second end of said vertical support member, forming an L shape with said vertical support member;
   a fastening mechanism for attaching said one or more fastening roller members to said plurality of arms, wherein said fastening mechanism is a U-bolt with a first end and a second end, said U-bolt engaging one of said first arm or said second arm, and said first end and said second end of said U-bolt secured to said second horizontal member; and
   a cover grasping mechanism.

28. The apparatus for covering a large object according to claim 27, wherein said cover grasping mechanism is comprised of:
   a handle with a curved tip, said handle having a rectilinear wall extending perpendicularly from said handle and pivotally engaged by a pivot bolt to said first horizontal member inside said slot lowering a pair of wheels whenever said handle is in a closed position and raising said pair of wheels whenever said handle is in an open position, said pair of wheels operatively attached to an axle, said axle passing through said rectilinear wall, wherein said pair of wheels rolls to allow a cover upon said large object to be released; and a pair of tension rs each having a first and end a second end, said pair of tensioners secured to said vertical support member at said first end and to said axle at said second end.

29. The apparatus for covering a large object according to claim 28, wherein said pair of tensioners are selected from a group comprising springs, air cylinders, hydraulic cylinders, and electric solenoids.

30. The apparatus for covering a large object according to claim 28, wherein said cover upon said large object is made of a material selected from a group comprising plastic and canvas.

31. The apparatus for covering a large object according to claim 24, wherein said large object is selected from a group comprising a loaded bed of a truck and a rail car.

32. The apparatus for covering a large object according to claim 24, wherein said apparatus comprises a safety device, wherein said safety device is a laser detection system for detecting one or more obstructions and halting said apparatus.

33. A method for covering a large object comprising:

securing a covering to one or more fastening roller members mounted to a plurality of movable arms;

lifting said plurality of movable arms and thereby lifting said covering;

placing said large object under said covering;

lowering said covering over said large object;

disengaging said covering from said one or more fastening roller members; and securing said covering to said large object.

34. The method of claim 33, wherein said lifting is performed by a lifting device, said lifting device comprising:

a shaft;

one or more motors mounted to a frame, operatively engaging said shaft;

said plurality of movable arms parallel to said frame and each having one or more hanging members; and a plurality of spools operatively engaging said shaft, each of said plurality of spools having a lifting connector attachment member for operatively engaging a plurality of lifting connectors, wherein each of said plurality of lifting connectors is attached on a first end to one of said connector attachment members of said plurality of spools and attached on a second end to said one or more hanging members of said plurality of movable arms.

35. The method of claim 34, wherein each of said plurality of lifting connectors is selected from the group comprising straps, ropes, chains, cable, and link belt.

36. The method of claim 33, wherein said lifting is performed by a lifting device selected from a group comprising one or more chain falls, an overhead crane, a rope and pulley system, and one or more winches.

37. The method of claim 33, wherein said one or more fastening roller members are comprised of:

a vertical support member, having a first end and a second end;

a first horizontal member fixedly secured to said first end of said vertical support member, forming a first L shape with said vertical support member and having portions forming a slot;

a second horizontal member fixedly secured to said second end of said vertical support member, forming a second L shape with said vertical support member;

a fastening mechanism for attaching said one or more fastening roller members to said plurality of arms; and a cover grasping mechanism.

38. The method of claim 37, wherein said fastening mechanism is a U-bolt with a first end and a second end, said U-bolt engaging an arm of said plurality of movable arms, and said first end and said second end of said U-bolt secured to said second horizontal members.

39. The method of claim 37, wherein said cover grasping mechanism is comprised of:

a handle with a tip, said handle having a rectilinear wall extending perpendicularly from said handle and pivotally engaged by a pivot bolt to said first horizontal member inside said slot, lowering a pair of wheels whenever said handle is in a dosed position, and raising said pair of wheels whenever said handle is in an open position said pair of wheels operatively connected to an axle, said axle going through said rectillin ar wall, wherein said pair of wheels rolls to allow said covering upon said large object to be released; and a pair of tensioners each having a first end and a second end, said pair of tensioners secured to said vertical support member at said first end and to said axle at said second end.

40. The method of claim 39, wherein said pair of tensioners is selected from a group comprising springs, air cylinders, hydraulic cylinders, and electric solenoids.

41. The method of claim 33, wherein said large object is selected from a group comprising a loaded bed of a truck and a rail car.

42. The method of claim 33, wherein said covering is selected from a group comprising a tarp and a canvas.

43. The method of claim 33, wherein said method comprises engaging a safety device, wherein said safety device is a laser detection system for detecting one or more obstructions and halting said plurality of arms.

* * * * *

UNITED STATES PATENT AND TRADEMARK OFFICE
CERTIFICATE OF CORRECTION

PATENT NO. : 6,857,620 B2
DATED : February 22, 2005
INVENTOR(S) : Fred V. Payne

It is certified that error appears in the above-identified patent and that said Letters Patent is hereby corrected as shown below:

Column 1,
Line 19, insert -- , -- between "unit with"
Line 61, "th" should read -- the --

Column 2,
Line 18, "Arm 19" should read -- Arms 19 --
Line 33, delete "is"

Column 3,
Line 14, "rectilin ar" should read -- rectilinear --.

Column 4,
Line 6, "low red" should read -- lowered --
Line 6, "th" should read -- the --
Line 19, "dearly" should read -- clearly --

Column 5,
Line 46, "on" should read -- one --

Column 7,
Line 13, "dosed" should read -- closed --

Column 8,
Line 42, "dosed" should read -- closed --

Column 9,
Line 3, "tension rs" should read -- tensioners --
Line 3, "and end a" should read -- end and a --

UNITED STATES PATENT AND TRADEMARK OFFICE
CERTIFICATE OF CORRECTION

PATENT NO. : 6,857,620 B2
DATED : February 22, 2005
INVENTOR(S) : Fred V. Payne

It is certified that error appears in the above-identified patent and that said Letters Patent is hereby corrected as shown below:

Column 10,
Line 30, "dosed" should read -- closed --

Signed and Sealed this

Seventeenth Day of May, 2005

JON W. DUDAS
*Director of the United States Patent and Trademark Office*